US005332273A

United States Patent [19]

Komachi

[11] Patent Number: 5,332,273

[45] Date of Patent: Jul. 26, 1994

[54] ACTUATOR FOR DOOR LOCK MECHANISM

[75] Inventor: Hiroshi Komachi, Tokyo, Japan

[73] Assignee: Harada Kogyo Kabushiki Kaisha, Tokyo, Japan

[21] Appl. No.: 921,935

[22] Filed: Jul. 29, 1992

[51] Int. Cl.[5] .......................... E05C 3/06; F16H 57/00

[52] U.S. Cl. .......................... 292/336.3; 292/DIG. 25

[58] Field of Search ............ 292/201, 336.3, DIG. 25, 292/144

[56] References Cited

U.S. PATENT DOCUMENTS 4,978,155 12/1990 Kobayashi ........................ 292/336.3

5,149,156 9/1992 Kleefeldt ........................ 292/201 X

*Primary Examiner*—Richard E. Moore

*Attorney, Agent, or Firm*—Koda and Androlia

[57] ABSTRACT

An actuator for a door lock mechanism, that is capable of sufficiently securing a strong driving force as well as a necessary stroke quantum, that is small in size, and that makes manual operation possible under a light load, comprising: a columnar body that is rotated by a forward-reverse motor and provided with, on its outer circumferential surface, a first spiral stage, which forms an upward gradient in a first direction when the columnar body rotates in a forward direction, a second spiral stage which forms an upper-gradient in a second direction when the columnar body rotates in a reverse direction; and a displacement component having one end driven to move in the first direction by the first spiral stage at the time of the positive rotation of the columnar body and in the second direction by the second spiral stage when the columnar body rotates in the reverse direction, thus causing another end of the displacement component to actuate a latch mechanism for locking doors.

2 Claims, 4 Drawing Sheets

FIG. 1(a)
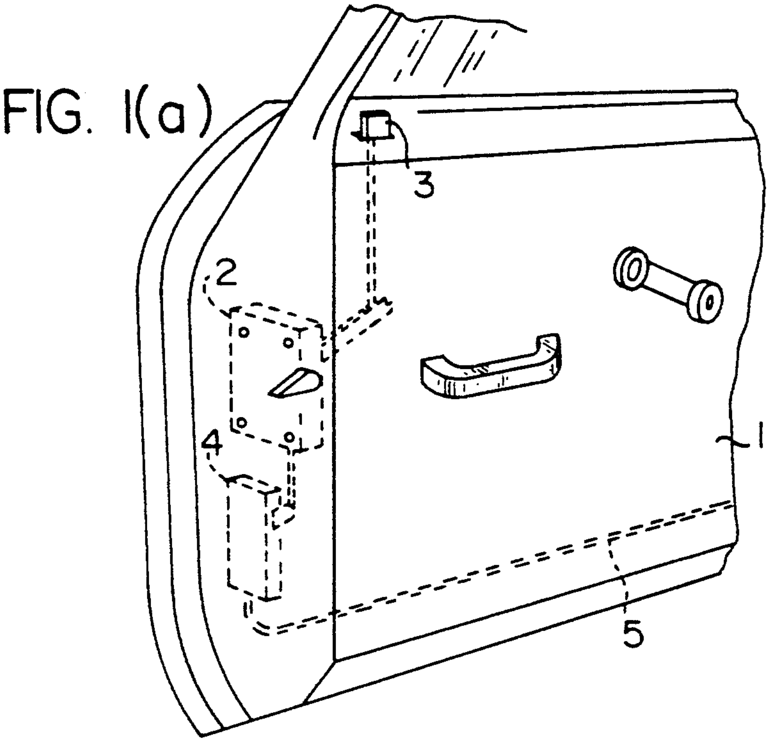
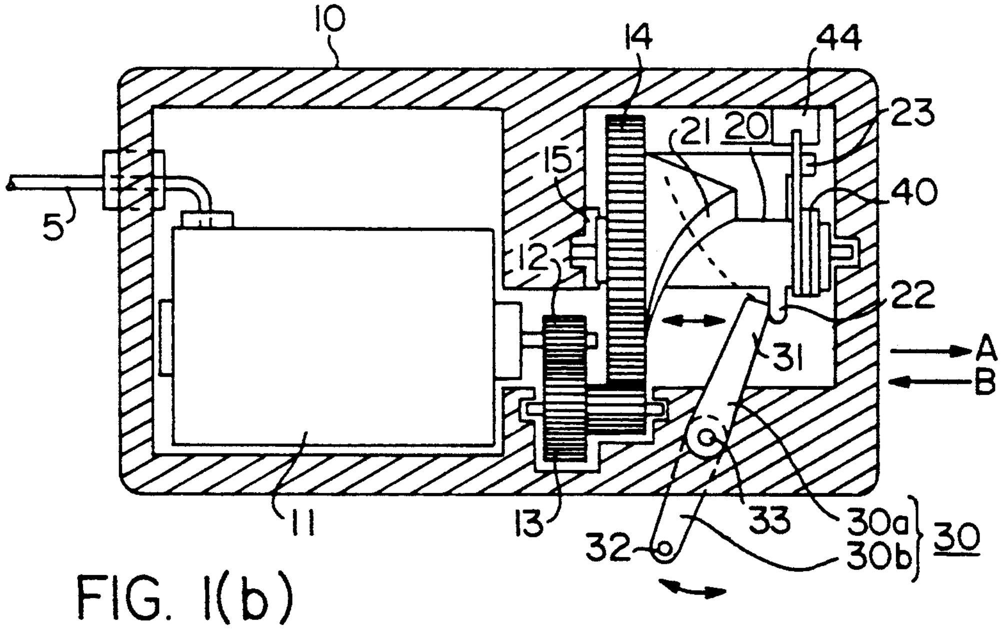
FIG. 1(b)

ACTUATOR FOR DOOR LOCK MECHANISM

BACKGROUND OF THE INVENTION

1. Field of the Invention

The present invention relates to an actuator for a door lock mechanism used for, for example, an automobile.

2. Prior Art

In conventional door lock system actuators of this type, a motor power is transmitted via a worm gear to a rotary disc that has a spiral guide. The spiral guide of the rotary disc shifts the position of one end of a rotatable lever, thus causing the other end of the rotary lever to actuate a latch mechanism that locks and unlocks the door.

In this conventional actuator, the spiral guide must be gentle in its curvature in order to increase the driving force that is transferred to the rotary lever. When the curvature of the spiral guide is gentle, however, the magnitude of displacement (stroke quantum) of the rotary lever relative to the rotation angle of the rotary disc becomes small. Accordingly, in order to secure a strong driving force as well as the required stroke quantum, it is inevitable to design the rotary disc large in diameter, which contrarily, results in a proportional enlargement of the actuator as a whole. Besides, the rotary disc is designed to stop after being positionally shifted; as a result, one end of the rotary lever is kept in contact with the spiral guide. If, in this state, an attempt is made to manually operate the door lock latch mechanism, it demands a strong force because the motor side, relative to the rotary lever, works as a load.

SUMMARY OF THE INVENTION

Accordingly, the object of the present invention is to provide a door lock actuator that can sufficiently secure a strong driving force as well as a necessary stroke quantum for the rotary lever.

Another object of the present invention is to provide an actuator for a door lock mechanism which is small in size and with which a manual door locking operation can be performed under a light load.

In order to accomplish the objects, the present invention employs the means as described below which comprises:

a columnar body driven to rotate by a motor that can rotate in forward and reverse directions in response to control signals supplied thereto, the columnar body having, on its peripheral surface, a first spiral stage that provides an upward gradient in a first direction along the center axis when the columnar body is rotated in the forward direction, and a second spiral stage that provides an upward gradient in a second direction along the center axis when the columnar body is rotated in the reverse direction; and a displacement component driven to move, at its one end, in the first direction by the first spiral stage, when the columnar body is rotated in the forward direction while driven to move, at the one end, in the second direction by the second spiral stage, when the columnar body is rotated in the reverse direction, thus operating the door lock latch mechanism with the other end.

It is preferable that the columnar body is, after being driven by the motor to rotate a specified angle, rotated back to its original position via the rebounding force of a spring. It is also preferable that the mutual positional relationship of the displacement component, the first spiral stage, and the second spiral stage is such that, at least when the columnar body has been rotated back to the original position, the one end of the displacement component is not in contact with either the first spiral stage or the second spiral stage of the columnar body.

It is further preferable that the first spiral stage and the second spiral stage are formed so that the lead angle of the spiral portion of each spiral stage gradually changes relative to the peripheral surface of the columnar body that is in a conical shape.

In other words, it is desirable to form the columnar body into a somewhat conical shape by setting the distance, that is between the center of the columnar body and the point of contact of the end of the displacement component with the spiral stage (i.e., the radius of the contact area), so as to become gradually smaller as the lead angle of the spiral portion of the spiral stage is increased. As a result, a large stroke quantum can be obtained by the increased lead angle, and the driving force drop that would be caused by the increased lead angle is compensated by the thus obtained small radius of the contact area.

The structure described above brings the effect as follows:

With the forward and reverse rotations of the columnar body, the contact point of the displacement component with the first spiral stage and the second spiral stage shifts in the first and second directions relative to the center axis of the columnar body. In this case, since the first spiral stage and the second spiral stage are formed three-dimensionally (in other words in a projected manner) on the peripheral surface of the columnar body that is in, for example, a conical shape, the columnar body can be relatively small in diameter. As a result, a specified driving force and stroke quantum required for driving the displacement component can be obtained relatively easily.

In addition, due to the rebounding force of the spring, the columnar body, after being rotated a specified angle, is rotated to return to its original position where the one end of the displacement component is not in contact with either the first spiral stage or the second spiral stage. As a result, a manual door locking under a light load is possible.

BRIEF DESCRIPTION OF THE DRAWINGS

FIG. 1(*a*) is a diagram showing an actuator for a door lock mechanism as an embodiment of this invention, the actuator being installed inside the door of an automobile;

FIG. 1(*b*) is a cross-sectional view showing the internal structure of the actuator of the present invention;

FIG. 3(*b*) is a front view thereof;

FIG. 3(*c*) is a right side view thereof;

FIG. 3(*d*) is a top view thereof;

FIG. 3(*e*) is an expanded view thereof; and

DETAILED DESCRIPTION OF THE INVENTION

Figure 2:
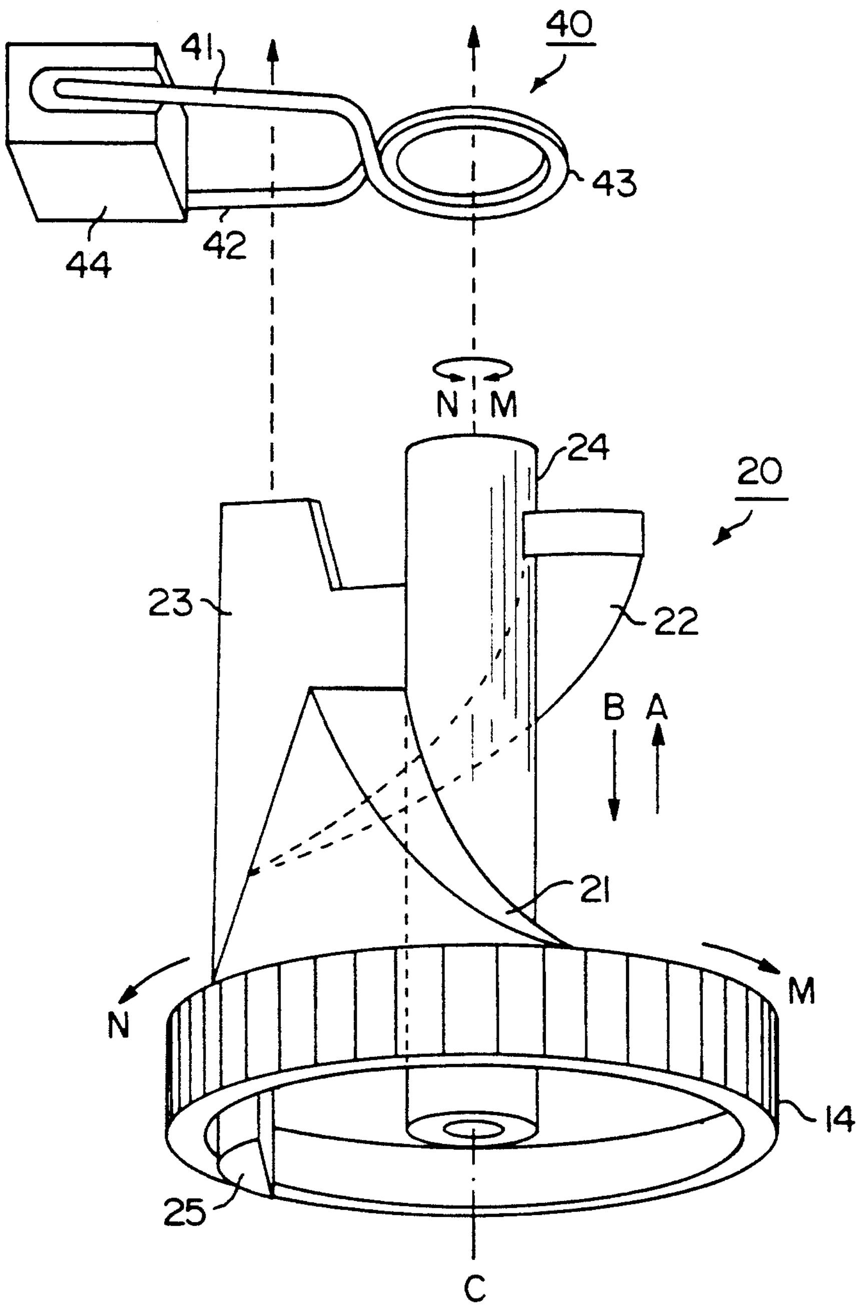
FIG. 2 is a perspective view showing in detail the structure of the columnar body and returning spring assembly used in the actuator for the door lock mechanism provided by the present invention.
Figure 3A:
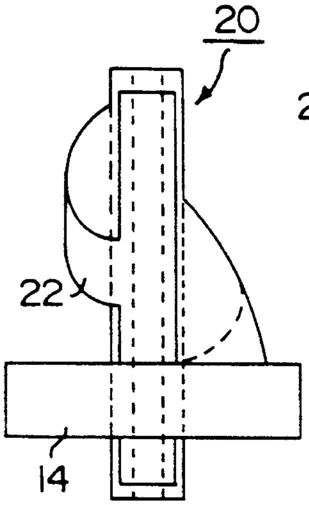
FIG. 3(*a*) is a left side view of the columnar body according to the present invention.
Figure 3B:
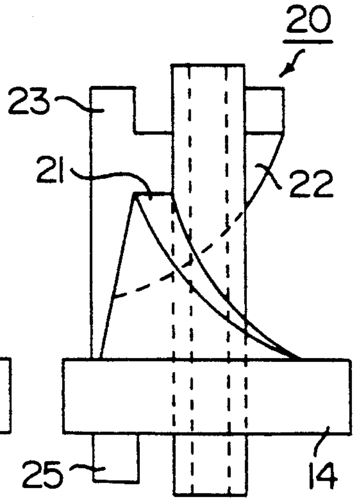
Figure 3C:
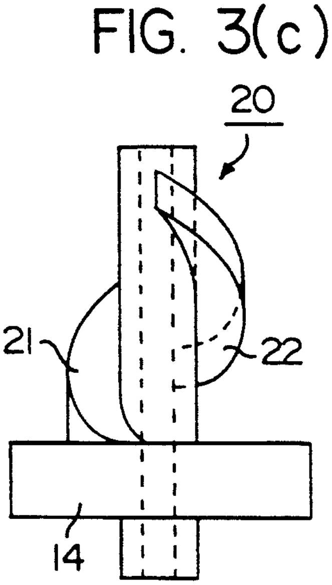
Figure 3D:
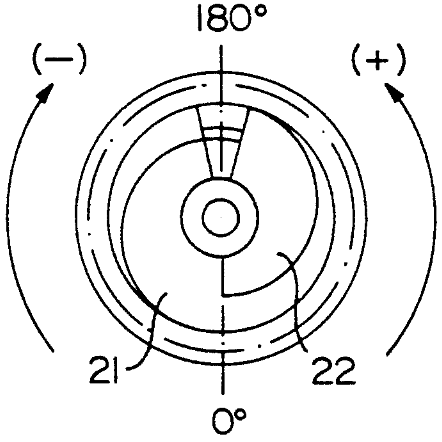
Figure 3E:
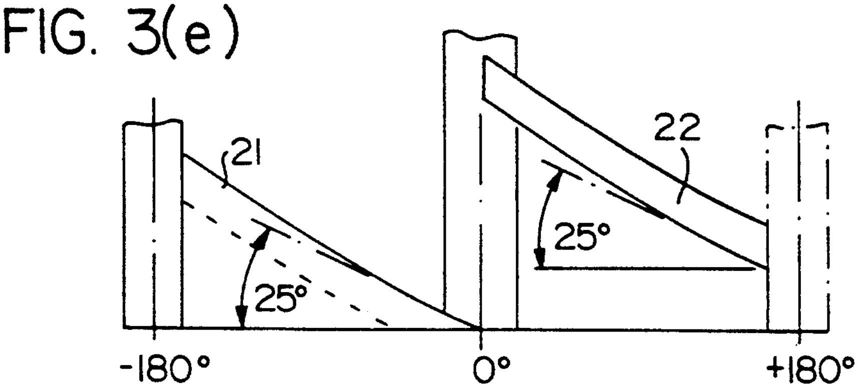
Figure 4A:
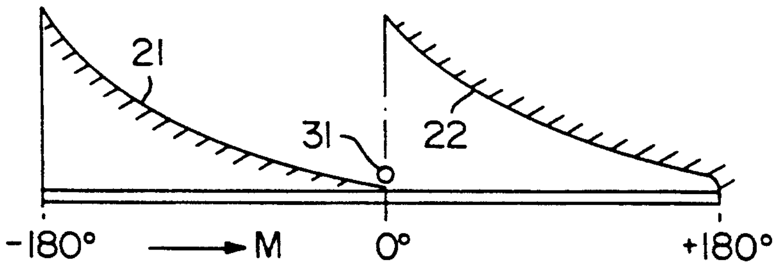
FIGS. 4(*a*) through FIG. 4(*e*) are diagrams illustrating the operation of the actuator according to the embodiment of this invention.
Figure 4B:
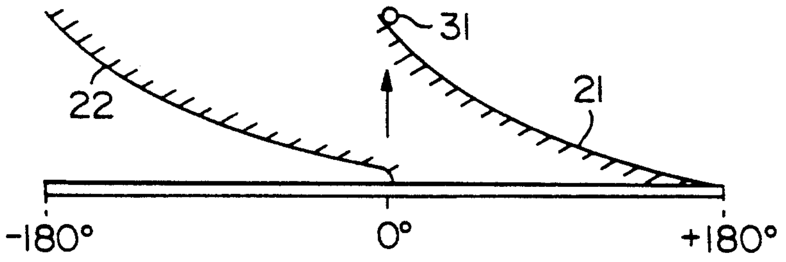
Figure 4C:
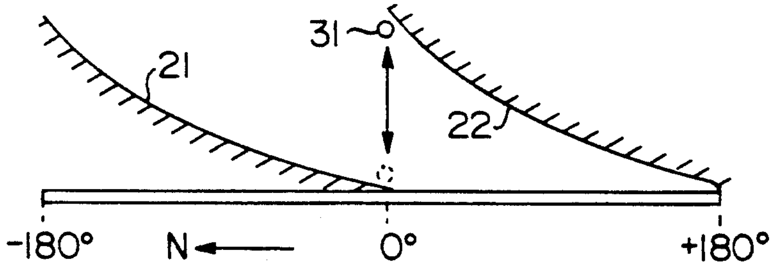
Figure 4D:
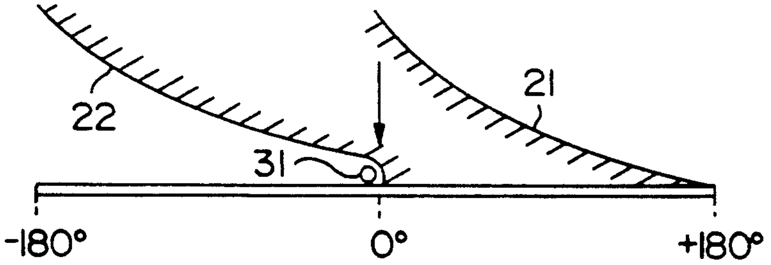
Figure 4E:
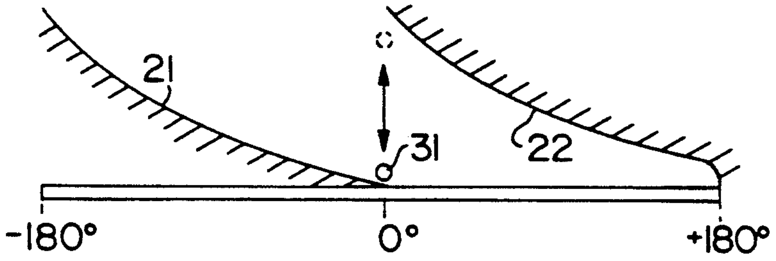

FIG. 1 illustrates a schematic structure of the actuator for a door lock mechanism according to one embodiment of the present invention. FIG. 1(*a*) shows the actuator provided in the door of an automobile, and FIG. 1(*b*) shows a cross-section of the actuator.

In FIG. 1(*a*), numeral 1 is a door of an automobile; and a latch mechanism 2, a manual operation button 3, and an actuator 4 are installed in the door 1 as the components that form the door lock mechanism. The actuator 4 is remote-controlled by control signals supplied via a lead wire 5.

In FIG. 1(*b*), numeral 10 is a case, and a motor 11 that rotates both ways in response to the control signal supplied via the lead wire 5 is housed in the case 10. The rotation of the motor 11 is transferred, through a pinion gear 12 and an intermediate two-stage gear 13, to a gear 14 of a columnar body 20 that is rotatably housed in the case 10.

FIG. 2 is a perspective view that shows in detail the structure of the columnar body 20 and a returning spring assembly 40 of the actuator for the door lock mechanism of the present invention. The description of the returning spring assembly 40 will be presented later.

FIG. 3 illustrates in detail the columnar body 20 according to the present invention. FIGS. 3(*a*), 3(*b*) and 3(*c*) show the left side, the front side and the right side of the columnar body, respectively; FIG. 3(*d*) is a top view of the columnar body; and FIG. 3(*e*) shows the columnar body with the outer surface spread out.

As shown in FIG. 2 and FIG. 3, the columnar body 20 has a first spiral stage 21 and a second spiral stage 22. These spiral stages are formed on the peripheral surface of a conical shaped base body so that the lead angle of the spiral portions of the spiral stages gradually changes (as shown in FIG. 3(*e*), preferably at about 25 degrees). More specifically, the first spiral stage 21 is formed so as to have an upward-gradient in the first direction A along the center axis C of the columnar body 20 when the columnar body 20 is rotated in a forward direction that is shown by arrow M. The second spiral stage 22 is formed so as to have an upward-gradient in the second direction B along the center axis of the columnar body 20 when the columnar body is rotated in the reverse direction that is shown by arrow N.

Returning to FIG. 1, a numeral 30 is a displacement component formed by connecting two rotary levers 30*a* and 30*b* at their base ends. The connected base ends are axially held by a supporting pin 33 so as to be rotatable. One end 31 of the displacement component 30 is designed so as to come into contact with the first spiral stage 21 and the second spiral stage 22 of the columnar body 20.

With the arrangement described above, when the columnar body 20 is rotated in the forward direction as indicated by arrow M, the end 31 of the displacement component 30 is driven to shift its position in the first direction A, while, when the columnar body 20 is rotated in the reverse direction as shown by arrow N, the end 31 is driven in the second direction B. When the end 31 moves like this, another end 32 of the displacement component 30 operates the latch mechanism 2 of the door lock.

After being driven by the motor 11 to rotate a specified angle, the columnar body 20 is stopped via a protruding claw 25 provided on the columnar body 20 coming into contact with a stopper 15 which has a buffering member. The thus stopped columnar body 20 is then rotated back to its original position (which is the position at 0 degrees in FIG. 3(*d*)) by means of a rebounding force of the spring assembly 40.

More specifically, as shown in FIG. 2, a protruding portion 23 of the columnar body 20 is inserted between legs 41 and 42 of the linear spring member of the spring assembly 40. Also, a cylinder portion 24 of the columnar body 20 is fitted in the coil portion 43 of the linear spring member of the spring assembly 40. The legs 41 and 42 sandwich both sides of a spring stopper 44 that is an integral part of the case 10.

With the structure described above, when the columnar body 20 is driven by the motor 11 to rotate a specified angle, either leg 41 or leg 42 is pushed open. When, in this state, the driving power for rotation is cut off, the columnar body 20 is rotated back by the rebounding force of the spring assembly 40 to its original position.

In the above structure, an adjustment can be made for the relative dimensions and other interrelations among the displacement component 30, the first spiral stage 21 and the second spiral stage 22 so that at least when the columnar body 20 has been brought back to its original position, the end 31 of the displacement component 30 is not in contact with the first spiral stage 21 nor the second spiral stage 22.

The operation of the actuator of this embodiment will be described below.

FIG. 4 is an illustration showing the operation of the actuator, wherein the columnar body 20 is shown stretched out in the circumferential direction. In the initial stage shown in FIG. 4(*a*), the end 31 of the displacement component 30 is positioned near the foot area of the first spiral stage 21. When, from this initial stage, the motor 11 operates in the forward direction, the columnar body 20 is caused to make a forward rotation which is in the direction of arrow M. This results in that the end 31 of the displacement component 30 is pushed up by the first spiral stage 21, thus bringing it to the state shown in FIG. 3(*b*). At this point, the rotation of the columnar body 20 is stopped by cutting off the power supply to the motor 11, and the columnar body 20 is rotated back in the reverse direction via the rebounding force of the spring assembly 40, thus returning to its original position as shown in FIG. 3(*c*). At this time, the end 31 of the displacement component 30 stays at the pushed-up position as described above and is not in contact with either the first spiral stage 21 or the second spiral stage 22. As a result, the displacement component 30 is in the condition to be moved up and down as indicated by the fat arrow. Therefore, a manual operation of the actuator is available under a light load.

Next, when, from this state, the motor rotates reversely, the columnar body 20 is rotated in the reverse direction shown by the arrow N in FIG. 2(*c*). This results in that the end 31 of the displacement component 30 is pushed down by the second spiral stage 22, thereby bringing about the state shown in FIG. 3(*d*). At this point, the rotation of the columnar body 20 is stopped by cutting off the power supply to the motor 11, and the columnar body, as a result, is rotated back in the forward direction via the rebounding force of the spring assembly 40, thus returning to its original position as shown in FIG. 3(*c*). At this moment, the end 31 of the displacement component 30 stays at the pushed-down position as described above and is not in contact with either the first spiral stage 21 or the second spiral stage 22. As a result, the displacement component 30 is in the condition to be moved up and down as shown by the fat arrow. Thus, a manual operation is available under a light load.

The present invention is not limited to the embodiment described above. For example, while in the foregoing embodiment a conical base body is used for the columnar body 20, it is also possible to use, for example, a cylindrical body that has spiral stage(s) formed at relatively sharply shifting lead angles. In addition, undoubtedly, various modifications can be made for the embodiment without departing from the spirit and the scope of the invention.

According to the present invention, with the forward and reverse rotations of the columnar body, the position of the point of contact of the displacement component with the first spiral stage and the second spiral stage moves in the first direction and in the second direction about the center axis of the columnar body. In this case, because the first spiral stage and the second spiral stage are formed three-dimensionally relative to the peripheral surface of the columnar body of, for example, a conical shape, the columnar body can be relatively small in diameter. As a result, it is easy to obtain a specific driving force as well as stroke quantum which are necessary to actuate the displacement component. Also, since the columnar body, after being driven to rotate a specified angle by the motor, is rotated back to the original position where the first spiral stage and the second spiral stage are not in contact with the end of the displacement component, a manual operation is available under a light load to lock the door with use of a manual operation button. Thus, according to the present invention, the actuator for the door lock mechanism can secure the strong driving force as well as the necessary stroke quantum, can be reduced in size, and makes it possible to perform the manual operation to lock the door under a light load.

I claim:

1. An actuator for a door lock mechanism comprising:

a motor that rotates reciprocally in response to a control signal supplied thereto;

a columnar body driven to rotate by said motor, said columnar body having, on the peripheral surface, a first spiral stage, which provides an upward gradient in a first direction along a center axis of said columnar body when said columnar body rotates in a forward direction, and a second spiral stage, which provides an upward gradient in a second direction along said center axis of said columnar body when said columnar body rotates in a reverse direction; and a displacement component, one end of said displacement component being driven to move in said first direction by said first spiral stage when said columnar body makes said forward rotation and also being driven to move in said second direction by said second spiral stage when said columnar body makes said reverse rotation, thus causing another end of said displacement component to actuate a door lock latch mechanism; and wherein said columnar body is rotated to return to its original position via a rebounding force of a spring after being driven to rotate a specific angle by said motor, and said displacement component, first spiral stage and second spiral stage are set for their mutual positional relations so as to prevent said one end of said displacement component from coming into contact with said first and second spiral stages at least when said columnar body is in said original position after rotating back thereto.

2. An actuator for a door lock mechanism comprising:

a motor that rotates reciprocally in response to a control signal supplied thereto;

a columnar body driven to rotate by said motor, said columnar body having, on the peripheral surface, a first spiral stage, which provides and upward gradient in a first direction along a center axis of said columnar body when said columnar body rotates in a forward direction, and a second spiral stage, which provides an upward gradient in a second direction along said center axis of said columnar body when said columnar body rotates in a reverse direction; and a displacement component, one end of said displacement component being driven to move in said first direction by said first spiral stage when said columnar body makes said forward rotation and also being driven to move in said second direction by said second spiral stage when said columnar body makes said reverse rotation, thus causing another end of said displacement component to actuate a door lock latch mechanism; and wherein said first spiral stage and said second spiral stage are formed in such a manner that a lead angle of spiral portions of said spiral stages is changed gradually relative to an outer circumferential surface of said columnar body which is in a conical shape.

* * * * *